UNITED STATES PATENT OFFICE.

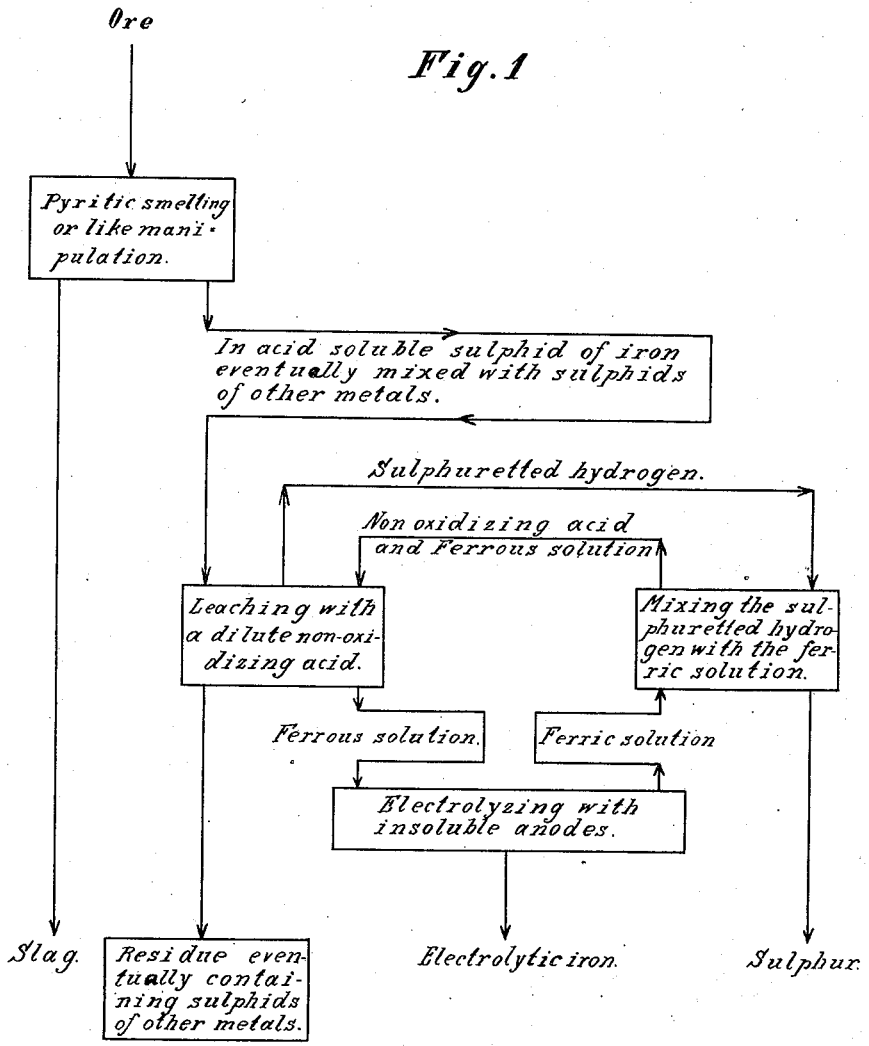

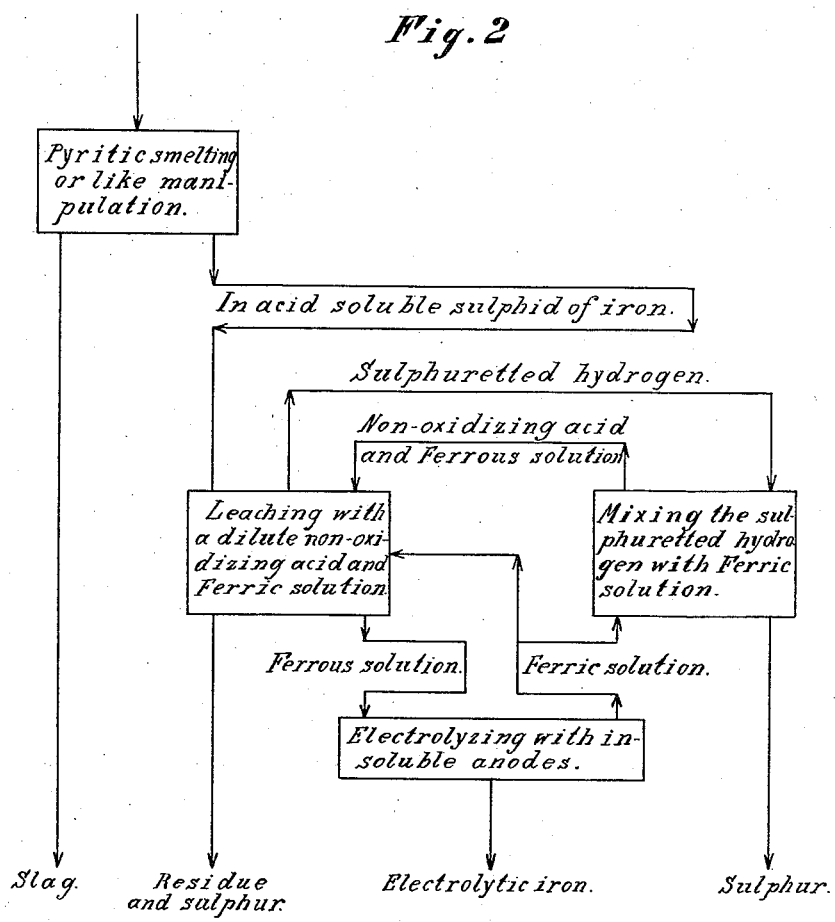

AXEL ESTELLE, OF HAGEN, WESTPHALIA, GERMANY.

PROCESS OF TREATING METALLIC ORES.

1,162,150.   Specification of Letters Patent.   Patented Nov. 30, 1915.

Application filed April 6, 1914. Serial No. 829,945.

*To all whom it may concern:*

Be it known that I, AXEL ESTELLE, a subject of the King of Sweden, residing at Hagen, Westphalia, Prussia, Germany, have invented certain new and useful Improvements in Processes of Treating Metallic Ores, of which the following is a specification.

My invention relates to a process of eliminating useful constituents from ores and smelting products, containing essentially the sulfur compounds of iron, and particularly to a process of eliminating the iron.

The sulfids of iron which exist in abundant quantities in nature, as iron pyrites and magnetic pyrites, as well as the whole of the ores which consist mainly of the sulfur compounds of iron, are, as is well known, scarcely ever regarded strictly as iron ores because owing to the sulfur contained in them they can only in rare cases be employed as raw material for the production of iron. These ores, especially iron pyrites, have consequently heretofore been mainly employed in the chemical industry for the manufacture of sulfurous and sulfuric acids, and are only of importance for metallurgical purposes when they contain a sufficiently large percentage of metals of some value, such as gold, silver, copper, nickel, cobalt and so on. The main constituents, iron and sulfur, are regarded only as encumbering admixtures which must be removed in the form of slag or be burnt off.

The subject-matter of the present invention is a process, which enables said ores to be turned to better account than heretofore, so that not only are extraneous metals which may be contained therein almost completely eliminated in a highly concentrated form, but also both the iron and the sulfur are extracted, the former largely or entirely as a very pure electrolytic iron and the latter in a pure and uncontaminated form.

The process according to this invention consists essentially in first leaching the raw material with weak non-oxidizing acid and in then precipitating the iron electrolytically with insoluble electrodes from the solution of the salt of iron so formed, a suitable method being employed for continuously regenerating the solution.

The various steps of the process are diagrammatically represented in the two sheets of drawings filed herewith.

Figure 1 illustrates the various steps by which the iron and sulfur are separated from each other and from the residue of the ore, the leaching being done simply by a dilute non-oxidizing acid. Fig. 2 illustrates the same when a part of the ferric solution produced by electrolysis is used with such dilute non-oxidizing acid as leaching fluid. The process is the same step for step, the difference being the addition of supplemental leaching liquid at one stage to the main leaching liquid first above mentioned. Of course the materials produced, evolved or separated by the various steps of the process may be collected, washed and used where available in continuation or repetition of the process as applied to first ore.

In carrying out this process, it is requisite that the raw material to be treated can be actually and sufficiently lixiviated by the dilute acid. This is readily attainable in the case of the monosulfid of iron, $i.$ $e.$ ferrous sulfid FeS, but the disulfid of iron, or ferric sulfid, $FeS_2$, is practically insoluble in the same acids. In the sulfur compounds of iron existent in nature, however, the ratio of sulfur to iron is in every case higher than in ferrous sulfid and these compounds are consequently more or less difficult to dissolve. When treating this raw material, the excess quantity of sulfur must first of all be removed and the sulfid of iron be thus brought into a readily soluble form. When the proportion of sulfur is high, as in the case of iron pyrites, the excess sulfur is preferably expelled by the application of intense heat without access of air, for example, in an electric furnace, this sulfur being of practical value as sublimed sulfur, and the gangue being in certain cases simultaneously removed as slag by employing suitable admixtures. When, on the other hand, magnetic pyrite wherein the access sulfur amounts to only 9 to 14%, is employed as raw material, it is preferable to produce or to employ a kind of pyritic smelting, so that, by sacrificing a portion of the iron and sulfur, the gangue may be slagged, and a higher percentage quantity of any extraneous metals present in the ore may be obtained. Another method I may employ is to cause the excess quantity of sulfur to combine or be chemically saturated with iron or another metal. After the sulfid of iron has been converted into the necessary, readily soluble form, the above described lixiviation and electrolytic treatment can be carried out.

It has already been frequently proposed to treat copper and zinc ores or their smelting-products in a similar manner. The known processes involving this treatment are however totally unsuitable, for the present purpose, because, when extracting iron, quite other conditions exist which render necessary a treatment essentially different from these processes.

For carrying the new process into practice, two cases must be considered:—(1) When the raw material contains valuable extraneous metals which it is desired to extract. This case is to be regarded as the normal one. (2) When the raw material contains no such metals.

The following is an example of the manner in which the present invention may be carried into effect. The raw material, disintegrated or reduced to a suitable grade, is treated at a temperature of about 40° to 80° C. with a dilute, non-oxidizing acid, preferably hydrochloric acid. Assuming that the latter acid be employed, the result of the reaction is the formation of ferrous chlorid and sulfureted hydrogen, in accordance with the well known equation:

$$FeS + 2HCl = FeCl_2 + H_2S \quad (1).$$

Other sulfur containing metals possibly present, as well as a small residue of gangue, remain behind in the lixiviating apparatus. These particular metals, being in this highly concentrated form, can subsequently be very advantageously realized. The solution of ferrous solution is electrolyzed in suitable decomposition or electrolytic cells with insoluble anodes, these cells being however of extremely simple construction because the solution contains only one single metal. A portion of the iron is now deposited while twice this amount of iron is converted into the corresponding ferric compound, as the following equation shows:

$$3FeCl_2 = Fe + 2FeCl_3 \quad (2)$$

The ferric chlorid obtained is now passed, together with the equivalent quantity of sulfureted hydrogen evolved in accordance with equation (1), into an absorption tower or other suitable, similar apparatus, the following known reaction then occurring:—

$$2FeCl_3 + H_2S = 2FeCl_2 + 2HCl + S \quad (3)$$

The acid previously combined with the electrolytically deposited iron is in this manner again liberated in order to be available for further use, while the corresponding, simultaneously separated quantity of sulfur needs only to be removed and converted by known methods into one of the commercial forms.

By this process there are therefore extracted in a simple manner not only the electrolytically deposited iron but also the corresponding quantity of sulfur. The valuable metals remain behind as compounds with sulfur and can be realized by a separate process. The acid employed as solvent is continually regenerated, and then reëmployed.

A special advantage of this process is that the sulfur is eliminated in a separate apparatus and is not rendered impure by the residues when the raw material is dissolved. An added advantage is that the electrolyzing devices can be of extremely simple construction, as it is a question of keeping several different metals separate from one another.

In the above stated second case, viz. when the sulfid of iron contains no valuable extraneous metals or at least not sufficient quantities of the same to warrant realization, the above described process may obviously be also employed. Under some circumstances it is however preferable somewhat to modify the process, for, since no valuable extraneous metals need to be taken into consideration, it would be possible directly to lixiviate the sulfid of iron with the ferric solution directly obtained from the electrolytic or decomposition cells. For this purpose however a certain quantity of free acid must be present, and as the solution to be electrolyzed should contain no free or at least no material quantity, the acid must be neutralized or saturated before the solution is subjected to electrolysis. This again would means a continual increase of the quantity of solution and a corresponding loss of acid and iron. This disadvantage can however be obviated by supplying only a portion of the ferric solution directly to the lixiviating apparatus, while the remainder is passed through the absorption tower provided for case No. 1, in order to reach the lixiviating apparatus only at some later time. In this manner the necessary quantity of free acid is supplied and as this should be neutralized, that quantity of sulfureted hydrogen which is necessary to furnish this acid is produced.

By the process forming the subject-matter of this invention it is therefore made possible to produce electrolytic iron from ores and smelting products which have hitherto been regarded as almost worthless. Moreover, the new process is applicable to any sulfid-containing smelting product, provided that the percentage of soluble sulfid of iron is sufficiently high.

As this invention is not limited in its application to one distinct product, it is of no consequence that the iron is obtained in a crude form as "electrolytic crude iron". The decomposition cells can on that account be of very simple construction. As no free acid is present, and no destructive gas is evolved at the anodes, the latter are well preserved.

The separated iron is preferably smelted in an electric furnace, this iron being if desired simultaneously alloyed with other metals for special purposes.

The iron may also be obtained in a very pure condition, especially when hydrochloric acid is employed as the solvent, in which case contamination with sulfur can be easily avoided. Other elements detrimental to the iron, such as arsenic and phosphorus can, without difficulty, be kept away from the electrolytic iron. As already stated, the valuable extraneous metals possibly contained in the ore are dissolved only in exceptional cases and in minute quantities. If metals which are precipitated by iron, e. g. particularly copper, should occasionally be found in the solution, they can be easily eliminated by this solution being electrolyzed. Of the remaining extraneous metals, practically only nickel, cobalt and zinc need be considered. The two first named, if they are electrolytically deposited simultaneously with the iron, can only enhance the value of the latter, while the zinc is again eliminated when the iron is smelted.

What I do claim as my invention and desire to secure by Letters Patent is:

1. A process of eliminating useful constituents from ores and smelting products, containing essentially the sulfur compounds of iron, consisting in leaching the raw material with a non-oxidizing acid, in electrolytically depositing iron from the ferrous solution obtained, in collecting in the leaching apparatus eventually remaining sulfid compounds of other metals, regenerating the solution and returning the same.

2. A process of eliminating useful constituents from ores and smelting products, containing essentially the sulfur compounds of iron not easily dissolved or insoluble in weak acids, consisting in bringing the sulfid of iron in a well known manner into a readily soluble form, in leaching the product with a non-oxidizing acid, in electrolytically depositing iron from the ferrous solution obtained, in collecting in the leaching apparatus eventually remaining sulfid compounds of other metals, regenerating the solution and returning the same.

3. A process of eliminating useful constituents from ores and smelting products, containing essentially the sulfur compounds of iron consisting in leaching the material with hydrochloric acid, in electrolytically depositing iron from the ferrous solution obtained, in collecting in the leaching apparatus eventually remaining sulfid compounds of other metals, regenerating the solution and returning the same.

4. A process of eliminating useful constituents from ores and smelting products, containing essentially the sulfur compounds of iron consisting in leaching the material with a non-oxidizing acid, in electrolytically depositing iron from the ferrous solution obtained, insoluble anodes being employed, in collecting in the leaching apparatus eventually remaining sulfid compounds of other metals, in washing the sulfureted hydrogen evolved at leaching with the ferric solution resulting from electrolysis, in collecting the sulfur so deposited, in employing the mixture of ferrous solution and acid, obtained by said washing for the leaching of the raw material and so on.

In testimony whereof, I have signed my name to this specification in the presence of two subscribing witnesses.

AXEL ESTELLE. [L. S.]

Witnesses:
HELEN NUFER,
ALBERT NUFER.